United States Patent [19]

Suzuki

[11] Patent Number: 5,272,555
[45] Date of Patent: Dec. 21, 1993

[54] BIDIRECTIONAL OPTICAL TRANSMISSION METHOD AND APPARATUS THEREFOR

[75] Inventor: Syuji Suzuki, Tokyo, Japan
[73] Assignee: NEC Corporation, Tokyo, Japan
[21] Appl. No.: 781,318
[22] Filed: Oct. 25, 1991

[30] Foreign Application Priority Data

Oct. 26, 1990 [JP] Japan .................................. 2-290527
Aug. 29, 1991 [JP] Japan .................................. 3-218766

[51] Int. Cl.⁵ .......................................... H04B 10/24
[52] U.S. Cl. .................................. 359/113; 359/152; 359/143
[58] Field of Search ............... 359/113, 114, 143, 152, 359/162, 173, 175, 179; 375/80, 94; 329/315, 318; 370/24

[56] References Cited

U.S. PATENT DOCUMENTS 5,005,212  4/1991  Wood ................................. 359/114

FOREIGN PATENT DOCUMENTS 0438832   7/1991  European Pat. Off. ............. 359/113
59-216335  6/1984  Japan .
59-216336  6/1984  Japan .
2181921    4/1987  United Kingdom .
2196809    5/1988  United Kingdom .

OTHER PUBLICATIONS

Nicholson, "Use of a Fibre Loop Reflector as Downstream Receiver and Upstream Modulator in Passive Optical Network", *Electronic Letters*, vol. 26 No. 12, pp. 827–828, Jun. 7, 1990.
Petrovic, et al., "Bidirectional Digital Optical Fiber System with Transmitters Synchronized with Receivers", *Journal of Optical Communications*, vol. 8, No.2, Jun. 1987, pp. 67–69.

*Primary Examiner*—Richard E. Chilcot, Jr.
*Assistant Examiner*—K. Negash
*Attorney, Agent, or Firm*—Foley & Lardner

[57] ABSTRACT

A method and an apparatus for bidirectional optical transmission capable of bidirectional communication through a single optical transmission path are disclosed. A light traveling in one direction is modulated by a first base band signal and another light beam traveling in a second direction is modulated by a subcarrier signal which is modulated by a second base band signal for subsequent conversion into the binary digit pulse. A light receiving circuit for receiving the light traveling in said second direction is comprised of a synchronizing detection demodulator and at least a light receiver to which an electrical signal synchronizing to the subcarrier signal is applied.

6 Claims, 9 Drawing Sheets

BIDIRECTIONAL OPTICAL TRANSMISSION METHOD AND APPARATUS THEREFOR

BACKGROUND OF THE INVENTION

The present invention relates to a bidirectional optical transmission method and apparatus therefor using a single optical transmission path.

As a conventional method for bidirectional optical transmission of signals between two stations through an optical transmission path such as an optical fiber and the like, there is a wavelength-division multiplexed (WDM) bidirectional optical transmissions method as described in IEEE, Journal of Lightwave Technology, Vol.7, No. 11, page 1733 to 1740.

Figure 1:
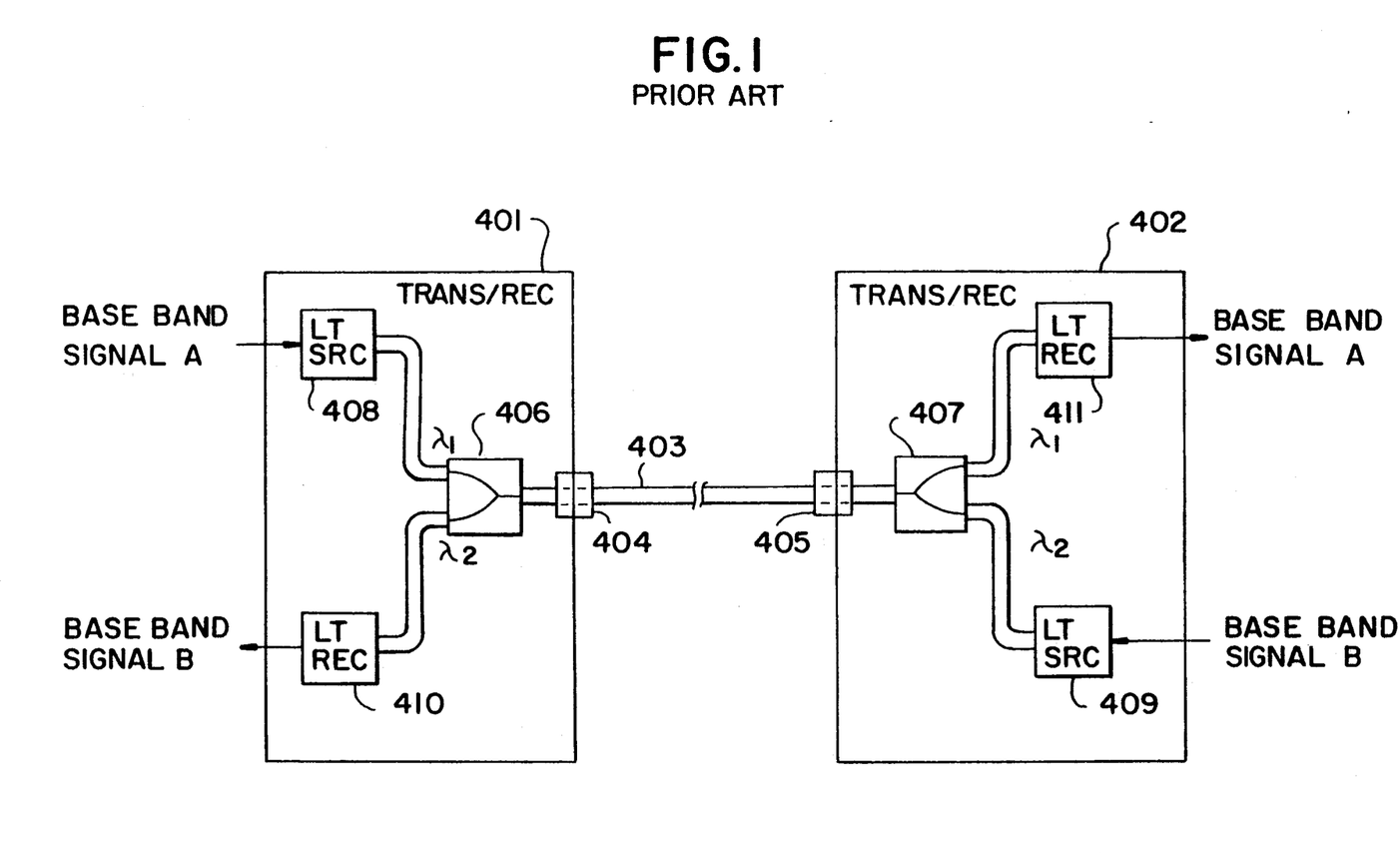
FIGS. 1 and 2 are pictorical views showing conventional apparatuses with bidirectional optical transmissions.

An apparatus according to the conventional method of the WDM bidirectional optical transmission is shown in FIG. 1 of the accompanying drawings. In FIG. 1, a base band signal A inputted into an optical transmitting-/receiving unit 401 is converted into a light signal of wavelength $\lambda_1$ at a light source 408, and fed out to an optical transmission path 403 through a wavelength multiplexer/demultiplexer (WMUX/DEMUX) 406 and an optical connector 404. The light signal of wavelength $\lambda_1$ inputted into an optical transmitting/receiving unit 402 through an optical connector 405 is supplied to a light receiver 411 through an WMUX/DEMUX 407 and is converted into an electrical signal. On the other hand, the base band signal B inputted into the optical transmitting/receiving unit 402 is converted into a light signal of wavelength $\lambda_2$ at a light source 409, and is fed to the optical transmission path 403 through the WMUX/DEMUX 407 and the optical connector 405. The light signal of wavelength $\lambda_2$ inputted into the optical transmitting/receiving unit 401 from the optical connector 404 is supplied to a light receiver 410 through the WMUX/DEMUX 406, and is converted into the electrical signal.

When the light signal of wavelength $\lambda_1$ from the light source 408 passes through the optical connectors 404 and 405, a part of the light signal is reflected. Since the reflected light signal has wavelength of $\lambda_1$, the signal returns only to the light source 408 by means of the WMUX/DEMUX coupler 406. Accordingly, the light receiver 410 is prevented from receiving interference due to the reflected light. Similarly, a part of the light signal of wavelength $\lambda_2$ from the light source 409 is reflected when the signal passes through the optical connectors 405 and 404, and the reflected signal returns only to the light source 409 by means of the WMUX/DEMUX coupler 407. Accordingly, the light receiver 411 is also prevented from receiving interference due to the reflected light.

Figure 2:
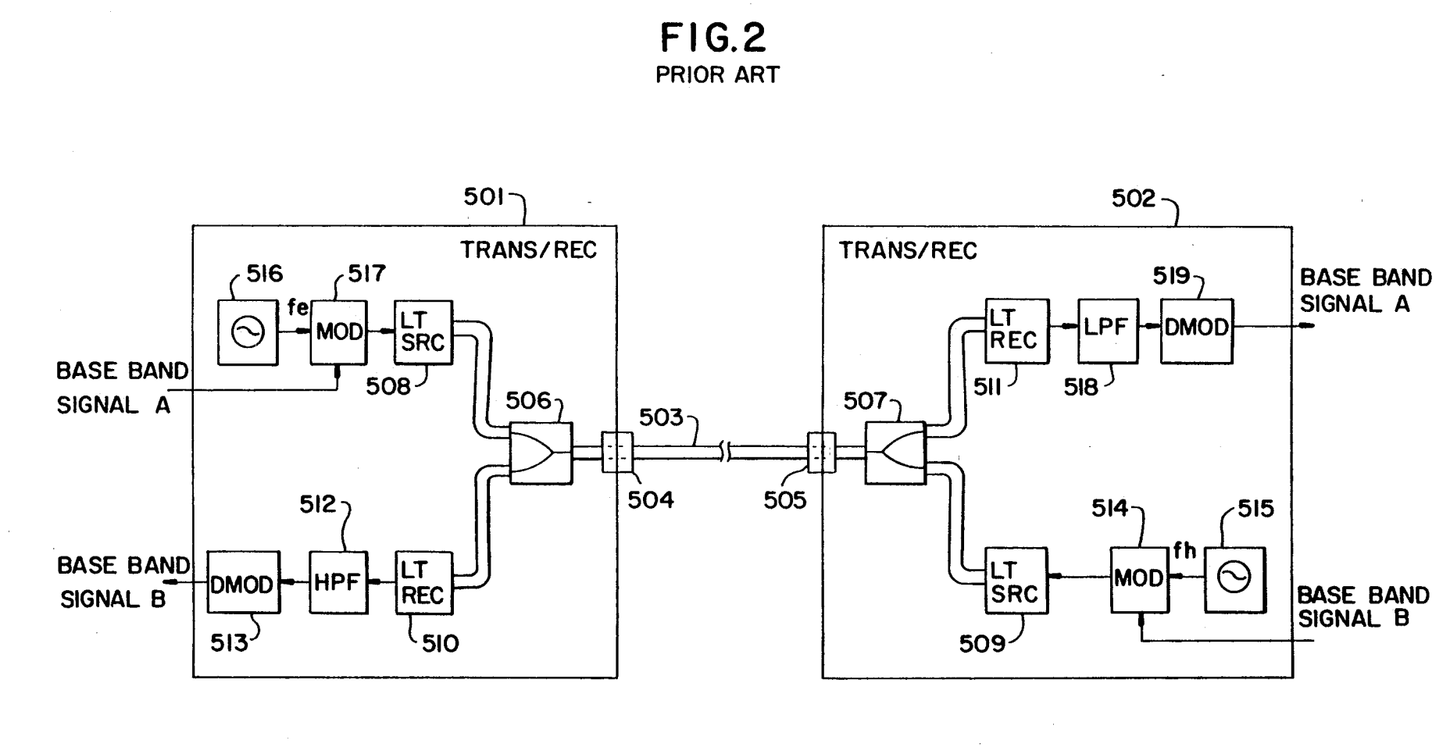

For another bidirectional optical transmission method, a multi-subcarrier bidirectional optical transmission method is described in IEEE, Journal of Lightwave Technology, Vol. 7, No. 11, pages 1819 to 1824. An apparatus according to the conventional method of multi-subcarrier bidirectional optical transmission is shown in FIG. 2. In FIG. 2, a base band signal A inputted into an optical transmitting/receiving unit 501 is introduced to a modulator 517. The modulator 517 frequency-modulates an output signal (a subcarrier signal) of frequency $f_l$ of the subcarrier oscillator 516 in accordance with the base band signal A. The subcarrier signal which is frequency-modulated by the base band signal A is converted into a light signal at a light source 508, and is fed out to an optical transmission path 503 through an optical coupler 506 and an optical connector 504. The light signal inputted into the optical transmitting/receiving unit 502 from an optical connector 505 is supplied on a light receiver 511 through an optical coupler 507, and is converted into an electrical signal. The electrical signal is inputted into a demodulator 519 through a low-pass filter 518 whose cut-off frequency is set to be slightly higher than frequency $f_l$ of the subcarrier oscillator 516, thus the base band signal A is outputted from the demodulator 519.

On the other hand, the base band signal B inputted into the optical transmitting/receiving unit 502 is introduced to a modulator 514. The modulator 514 frequency-modulates an output signal (a subcarrier signal) of frequency $f_h$ of a subcarrier oscillator 515 in accordance with the base band signal B. Now assume that the frequency $f_h$ is higher than $f_l$. The subcarrier signal frequency-modulated by the base band signal B is converted into a light signal at a light source 509, and is fed out to the optical transmission path 503 through the optical coupler 507 and optical connector 505. The light signal inputted into the optical transmitting/receiving unit 501 from the optical connector 504 is supplied to a light receiver 510 through the optical coupler 506, and is converted into an electrical signal. The electrical signal is inputted into a demodulator 513 through a high-pass filter 512 whose cut-off frequency is set to be slightly lower than frequency $f_h$ of the subcarrier oscillator 515, thus the base band signal B is outputted from the demodulator 513.

When the light signal from the light source 508 passes through the optical connectors 504 and 505, a part of the light signal reflects, and returns to the light receiver 510 through the optical coupler 506. Accordingly, the output of the light receiver 510 is comprised of the frequency-modulated subcarrier signal having a carrier frequency $f_h$ which is intrinsically received and the other frequency-modulated subcarrier signal having a carrier frequency $f_l$ that is an interfering wave due to such reflection. However, the interfering wave is removed by the high-pass filter 512. Similarly, when the light signal from the light source 509 passes through the optical connectors 504 and 505, a part of the light signal reflects and returns to the light receiver 511 through the optical coupler 507. Accordingly, the output of the frequency-modulated light receiver 511 is comprised of the subcarrier signal having a carrier frequency $f_l$ which is intrinsically received and the other having a carrier subcarrier signal having a carrier frequency $f_h$ that is the interfering wave due to such reflection. However, the interfering wave is removed by the low-pass filter 518.

However, in the apparatuses of the conventional methods of bidirectional optical transmission as hereinbefore described, wavelengths of the opposed light sources are set to be different from each other and are free of interference communication due to reflection of light through the use of the WMUX/DEMUX stages, and thus problems exist due to the higher cost of the transmission apparatus necessitated by the expensive WMUX/DEMUX stages and two sets of modulators and demodulators for the subcarrier signals.

SUMMARY OF THE INVENTION

The bidirectional optical transmission method according to the present invention, the lights are allowed to bidirectionally travel in a single optical transmission path to carry out bidirectional communications by first and second base band signals, wherein the light traveling in one direction is modulated by the first base band signal and the opposite light traveling in another direction is modulated by a subcarrier signal which is modulated by the second base band signal.

Further, the subcarrier signal is modulated by the second base band signal for subsequent conversion into a binary digital pulse waveform which had modulated the light.

The bidirectional optical transmission apparatus according to the invention, the light receiving circuit for receiving the light traveling in the opposite direction is comprised of a light receiver and a synchronizing detection demodulator.

More further, the light receiving circuit includes at least a light receiver to which an electrical signal synchronizing to the subcarrier signal is applied.

BRIEF DESCRIPTION OF THE DRAWINGS

The invention with be described more in detail with reference to the accompanying drawings.

PREFERRED EMBODIMENTS OF THE INVENTION

Figure 3:
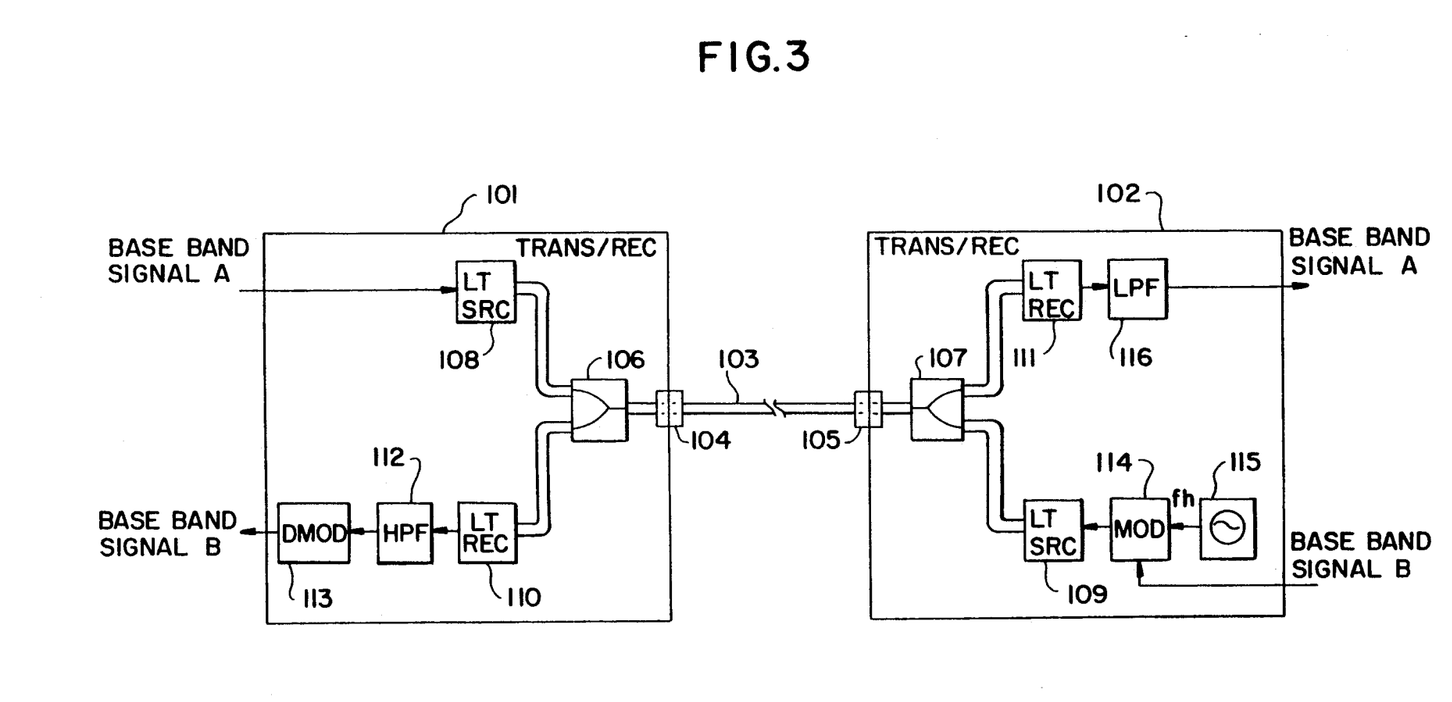
FIG. 3 is a pictorical view showing the first embodiment of a bidirectional optical transmission apparatus according to the present invention.

In FIG. 3, the bidirectional optical transmission apparatus for the base band signals A and B with the binary digital pulse waveform is shown. The base band signal A inputted into an optical transmitting/receiving unit 101 is converted into a light signal at a light source 108 and is fed out to an optical transmission path 103 through an optical coupler 106 and an optical connector 104. The light signal inputted to an optical transmitting-/receiving unit 102 from an optical connector 105 is supplied to a light receiver 111 through an optical coupler 107 and is converted into an electrical signal. The electrical signal passes through a low-pass filter 116 and is outputted as a received base band signal A. On the other hand, the base band signal B inputted into the optical transmitting/receiving unit 102 is introduced to a modulator 114. The modulator 114 modulates an output signal (a subcarrier signal) from frequency $f_h$ of the subcarrier oscillator 115 in accordance with the base band signal B. For the type of modulation in this case, for example, frequency modulation could be employed, and if the base band signal is a binary digital signal of 1.5 Mb/s, $f_h$ may be 6 MHz. The subcarrier signal frequency-modulated by the base band signal B is converted into a light signal at a light source 109 and is fed out to the optical transmission path 103 through the optical coupler 107 and the optical connector 105. The light signal inputted into the optical transmitting/receiving unit 101 from the optical connector 104 is supplied to the light receiver 110 through the optical coupler 106 and is converted into an electrical signal. The electrical signal is inputted to the demodulator 113 through the high-pass filter 112 and the base band signal B is outputted from demodulator 113.

Figure 4:
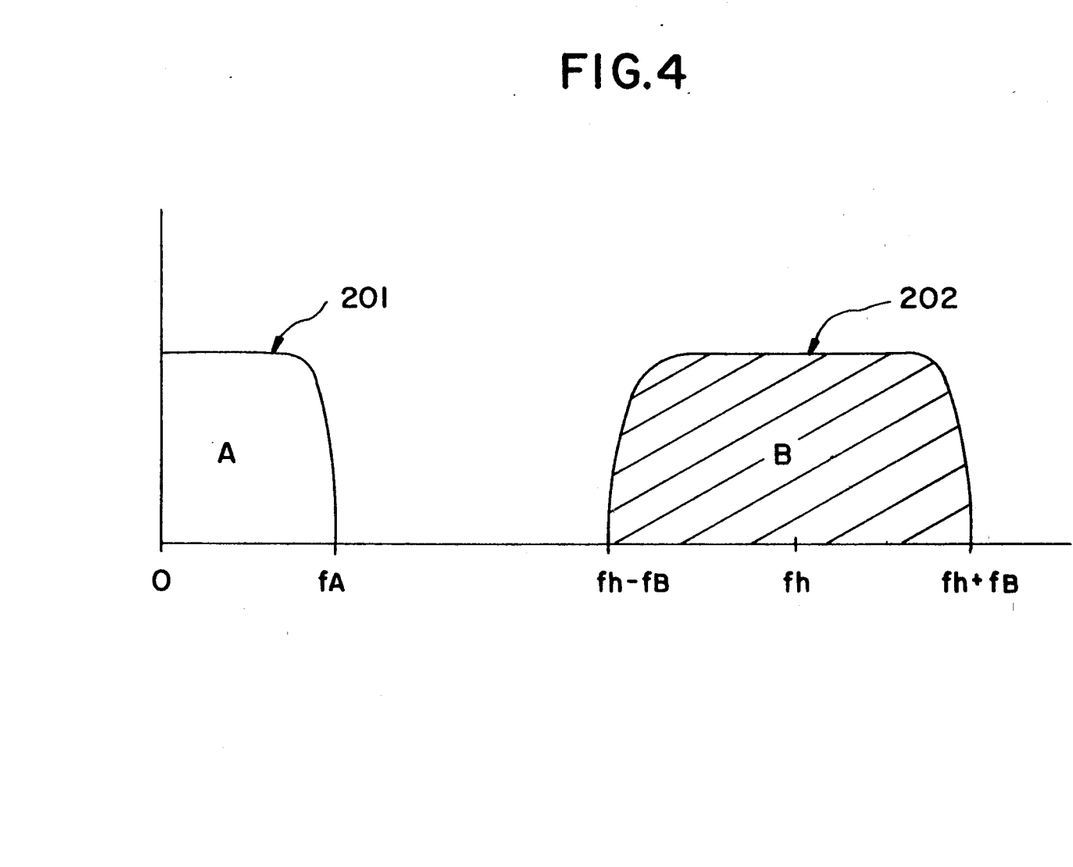
FIG. 4 is a spectrum diagram of electrical signals of the embodiment in FIG. 3.

In FIG. 4, a spectrum 201 is for the base band signal A, and it is distributed in a frequency range equal to or less than frequency $f_A$. A spectrum 202 expresses a subcarrier signal or the output of the modulator 114, and is distributed in the frequency range form $f_h-f_B$ to $f_h+f_B$ centering around frequency $f_h$. The spectrums 201 and 202 are not overlapped each other.

In FIG. 3, when the light signal from the light source 108 passes through the optical connectors 104 and 105, a part of the light signal reflects and returns to the light receiver 110 through the optical coupler 106. Accordingly, the output of the light receiver 110 includes the subcarrier signal intrinsically to be received and with the spectrum 202 and the interfering signal produced by reflection and with the spectrum 201. However, the spectrums 201 and 202 are not overlapped each other, thus the interfering signal with the spectrum 201 is removed by the high-pass filter 112 whose cut-off frequency is set intermediate between $f_A$ and $f_h-f_B$. On the other hand, when the light signal from the light source 109 passes through the optical connectors 105 and 104, a part of the light signal reflects and returns to the light receiver 111 through the optical coupler 107. Accordingly, the output of the light receiver 111 includes the base band signal A intrinsically to be received and with the spectrum 201 and the interfering signal produced by reflection and with the spectrum 202. Also in this case, the interfering signal with the spectrum 202 is removed by the low-pass filter 116 whose cut-off frequency is set intermediate between $f_A$ and $f_h-f_B$.

Figure 5:
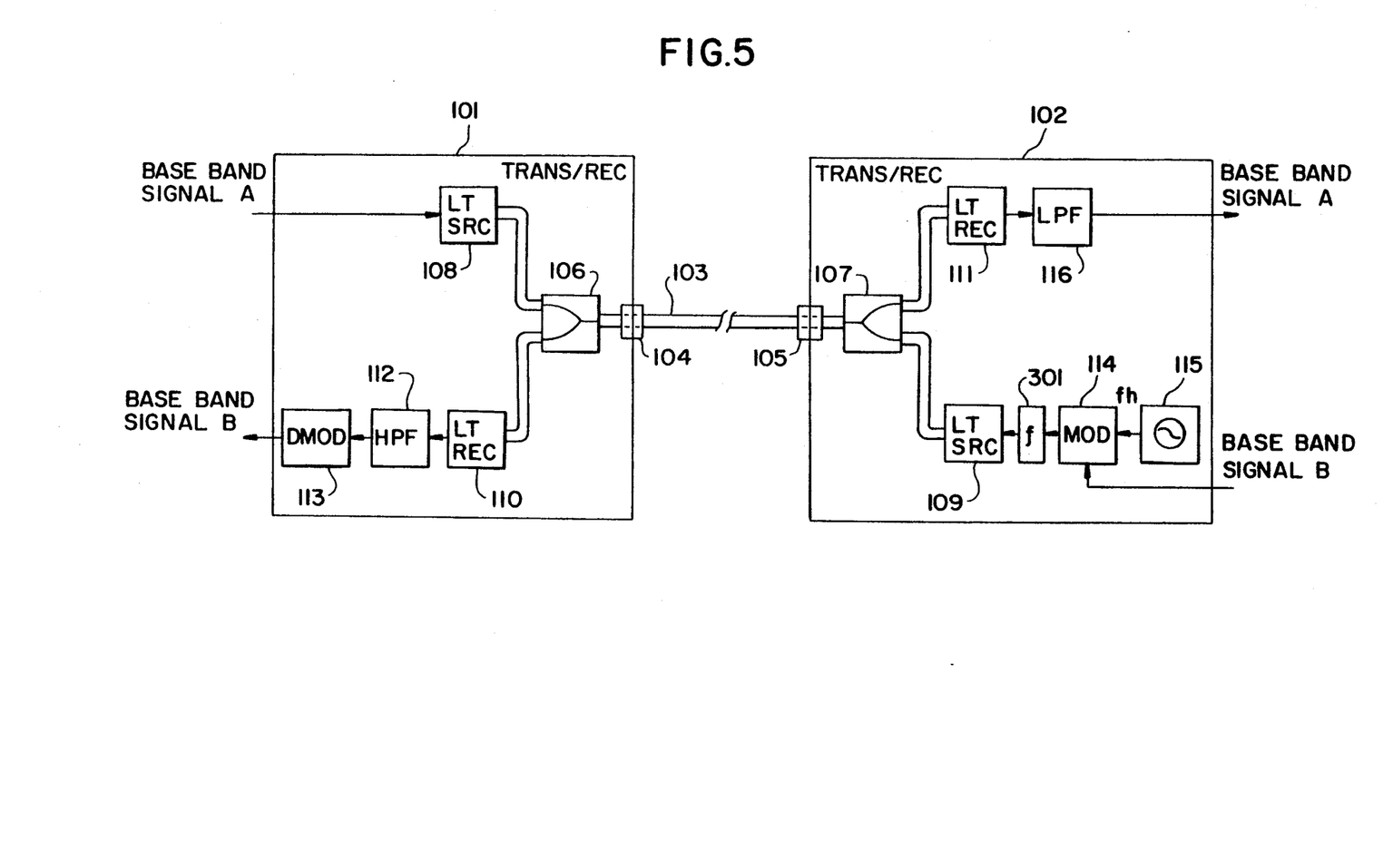
FIG. 5 is a pictorical view showing the second embodiment of a bidirectional optical transmission apparatus according to the invention.

FIG. 5 shows the second embodiment of the invention in which there is added to the first embodiment a pulse waveform producing device. This embodiment is provided with a pulse waveform producing device 301 between the modulator 114 and the light source 109. By means of the pulse producing device 301, the subcarrier signal outputted from the modulator 114 is converted into a binary digital waveform and thereafter inputted into the light source 109. Accordingly, the light source 109 is not necessary to have a high grade linear characteristic. In this case, the spectrum of signal outputted from the pulse waveform producing device 301 becomes to include high-frequency with several times in the integer number the spectrum 202 in FIG. 4. These frequencies include only higher frequency components than the spectrum 202, and are not laminated with the spectrum 201. Thus even in the embodiment in FIG. 5, the interfering signal produced by reflection is eliminated by the high-pass filter 112 and the low-pass filter 116.

The embodiments hereinbefore described employ a frequency modulation system for the subcarrier modulation system, however, an amplitude modulation, a pulse modulation, and the like could also be employed. For the base band signal, there could be used not only binary digital waveform signals but also analog signals or the signals on or above ternary digit. A relationship between the frequency band of the base band signal and the frequency $f_h$ of the subcarrier signal could be set optionally if the spectrums 201 and 202 are not laminated as shown in FIG. 4.

Figure 6:
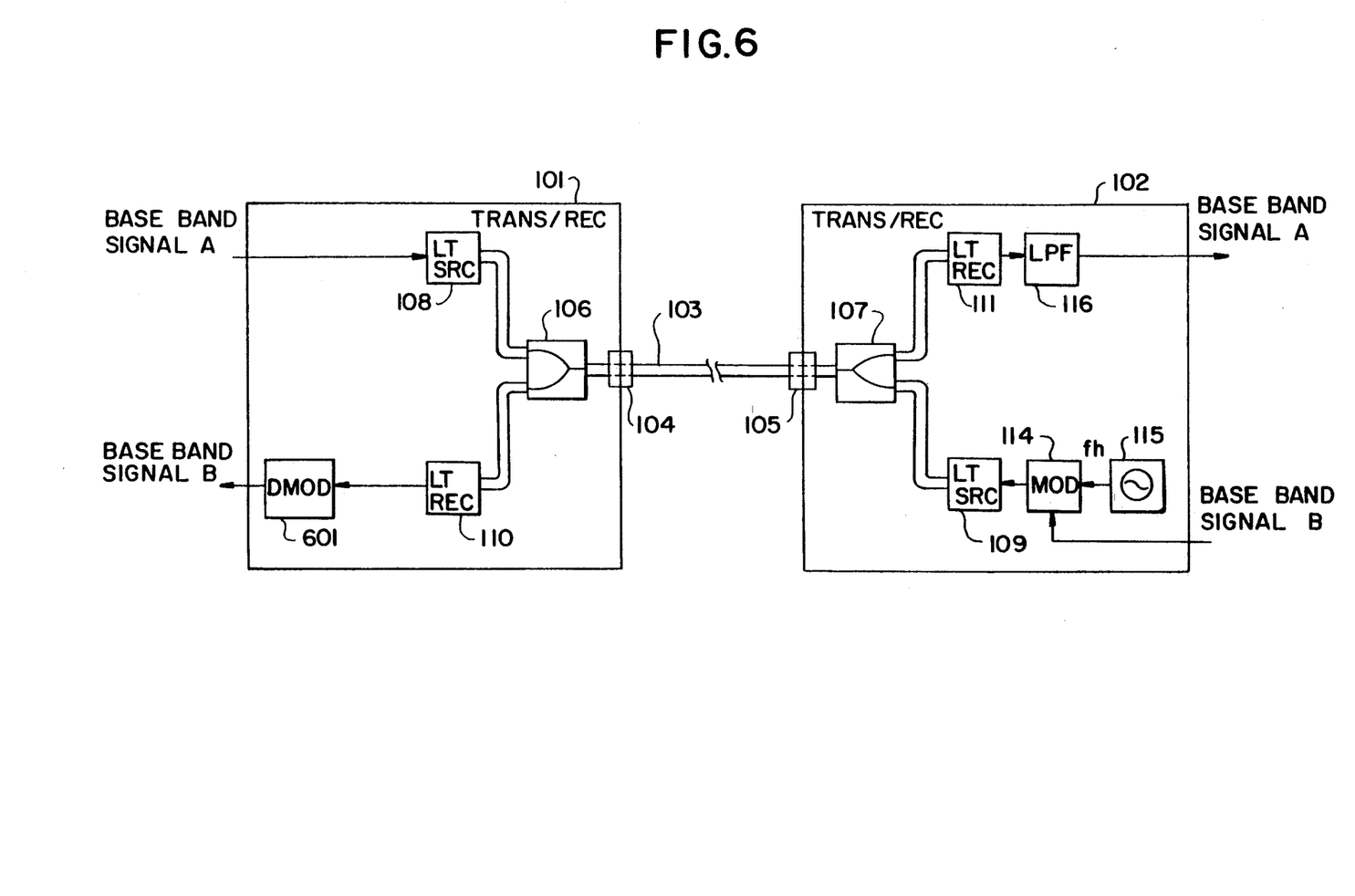
FIG. 6 is a pictorical view showing the third embodiment of a bidirectional optical transmission apparatus according to the invention.

In FIG. 6, as compared with the embodiment shown in FIG. 3, a synchronizing detection demodulator 601 is employed as the demodulator 113, so that the high-pass filter 112 could thus be omitted with lower cost for the transmitting apparatus.

Figure 7:
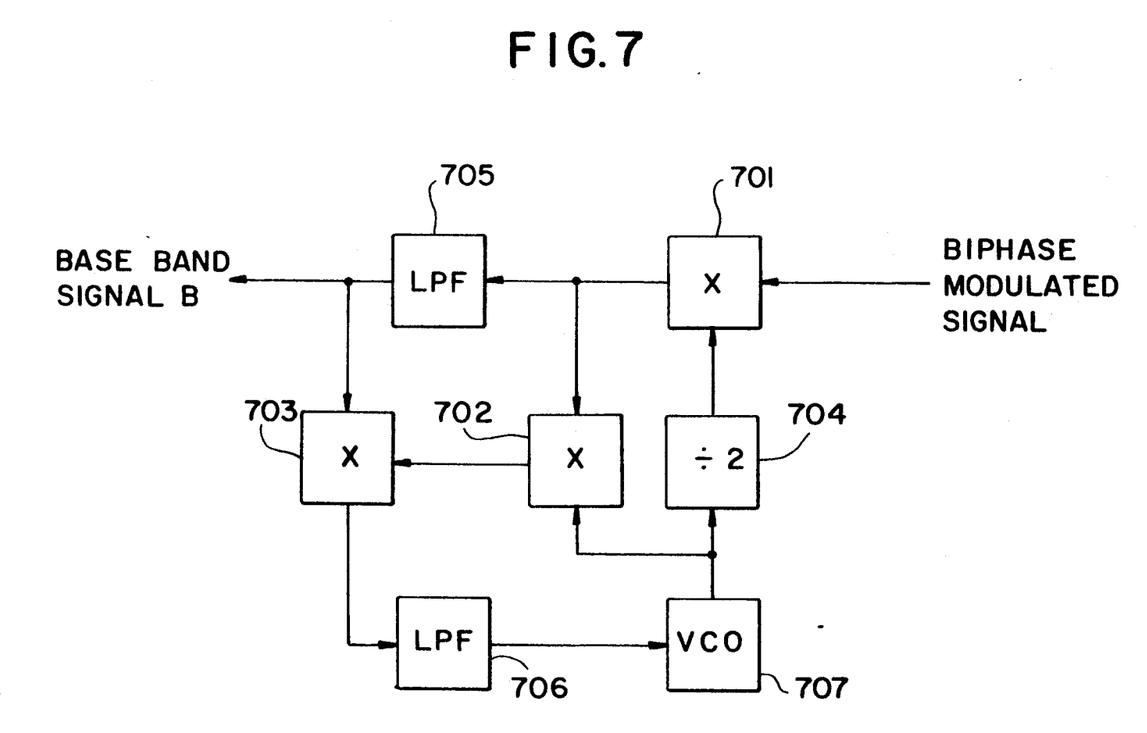
FIG. 7 is a block diagram showing an embodiment of the synchronizing detection demodulator of FIG. 6.

FIG. 7 shows an example of the synchronizing detection demodulator 601. In FIG. 7, a bi-phase modulated signal to be demodulated is inputted to a multiplier 701, and is multiplied by the signal frequency-divided by two from an output of a voltage controlled oscillator 707. On the other hand, a low-pass filter 705 passes only low-frequency components of the extent of the frequency band of the base band signal B from among the output signals of the multiplier 701, thus its output signal is satisfied by the following formula, $$\frac{A1 \cdot A2}{2} \sin(-\Delta\theta \pm 90°) = \pm \frac{A1 \cdot A2}{2} \cos \Delta\theta$$

where the demodulation is carried out for a base band signal B whose amplitude is varied positive or negative depending on a phase variation of $\pm 90°$ of the bi-phase modulated signal. The signal is inputted to a multiplier 703, and accordingly the output signal of the multiplier 703 is expressed by the following formula, $$\frac{A1 \cdot A2 \cdot A3}{8} [ -\tfrac{1}{2} \sin(\Delta\theta \pm 180°) +$$
$$\sin(-\Delta\theta \pm 90°) \{\cos(4\pi f_h + \Delta\theta \pm 90°) -$$
$$\cos(4\pi f_h - \Delta\theta \pm 90°) - \cos(8\pi f_h + \Delta\theta \pm 90°)\}].$$

When a low-frequency component approximating direct-current of the output signal is removed by a low-pass filter 706, the following formula is established, $$-\frac{A1 \cdot A2 \cdot A3}{16} \sin(\Delta\theta \pm 180°)$$
$$= \frac{A1 \cdot A2 \cdot A3}{16} \sin \Delta\theta$$

where there is obtained a signal proportional to a phase difference $\Delta\theta$. Accordingly, with this value inputted to voltage controlled oscillator 707, automatic control is performed to make $\Delta\theta$ zero.

Figure 8A:
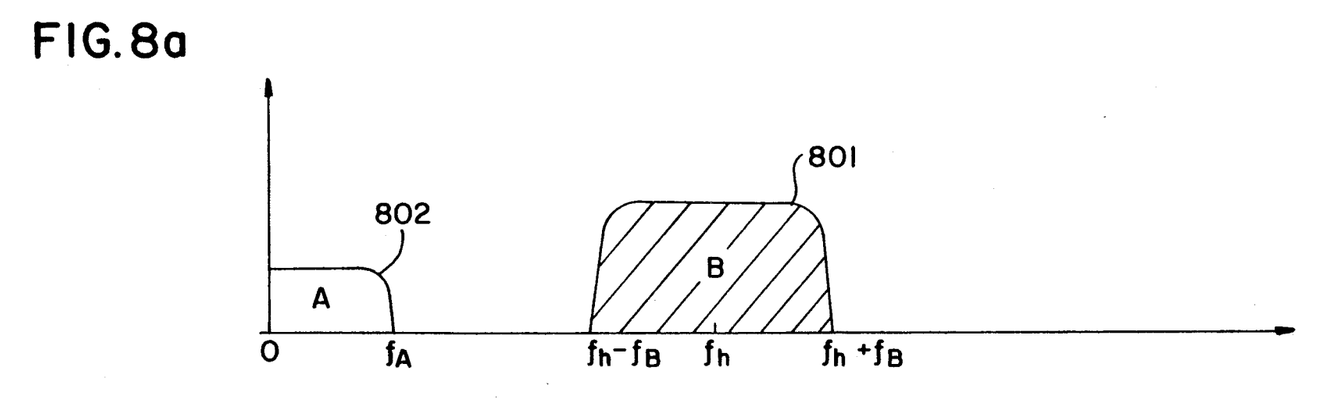
FIGS. 8a-8b are spectrum diagrams of electrical signals of FIG. 7.
Figure 8B:
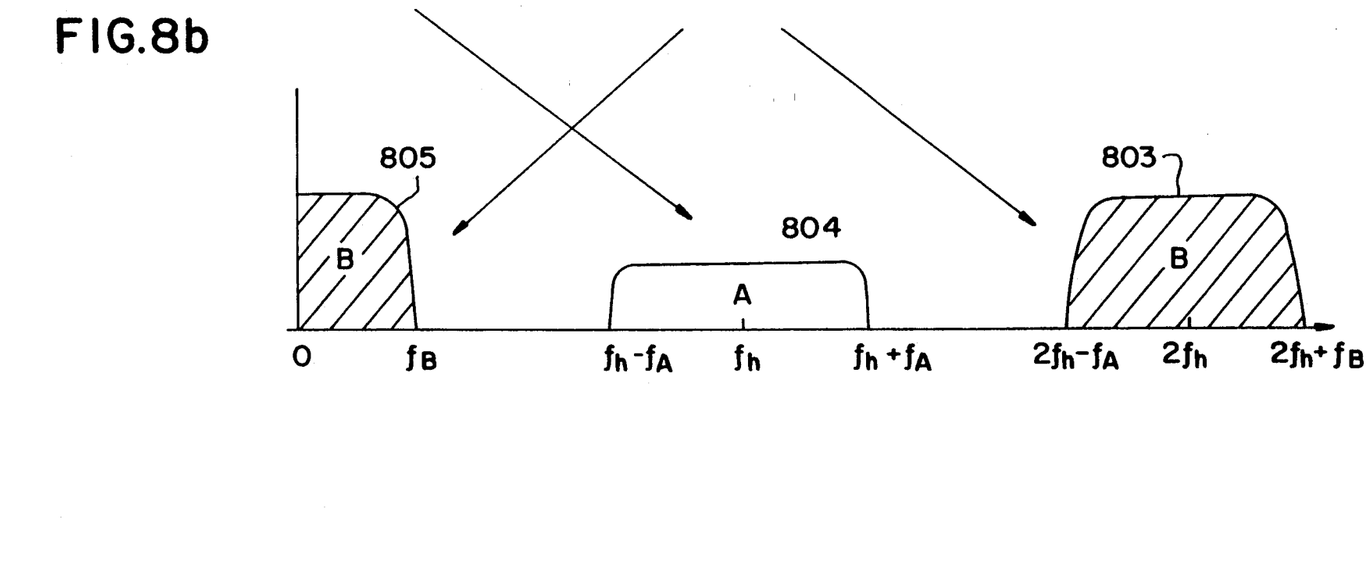

FIGS. 8(a) and 8(b) are diagrams illustrative of spectrums of input and output signals for the multiplier 701 within the synchronizing detection demodulator shown in FIG. 7. FIG. 8(a) illustrates spectrums of the input signal to the multiplier 701, which spectrums are comprised of a spectrum 801 of the signal in which the subcarrier of frequency $f_h$ is bi-phase modulated by the base band signal B and another spectrum 802 of the base band signal A of the interfering signal produced by reflection. In the output spectrums for the multiplier 701 shown in FIG. 8(b), the multiplication causes frequency conversion, and so the spectrum 801 is converted into two spectrums, a spectrum 805 with a base band signal B and a spectrum 803 with a center frequency $2f_h'$. On the other hand, the spectrum 802 is converted into a spectrum 804 with a center frequency $f'$. Accordingly, if only the spectrum 805 is allowed to pass by the low-pass filter 705 in FIG. 7, the base band signal B would be obtained free of the interfering signal. In this way, the construction in FIG. 6 could prevent the interfering signal without requiring provision of a high-pass filter in the previous stage of the synchronizing detection demodulator 601.

Figure 9:
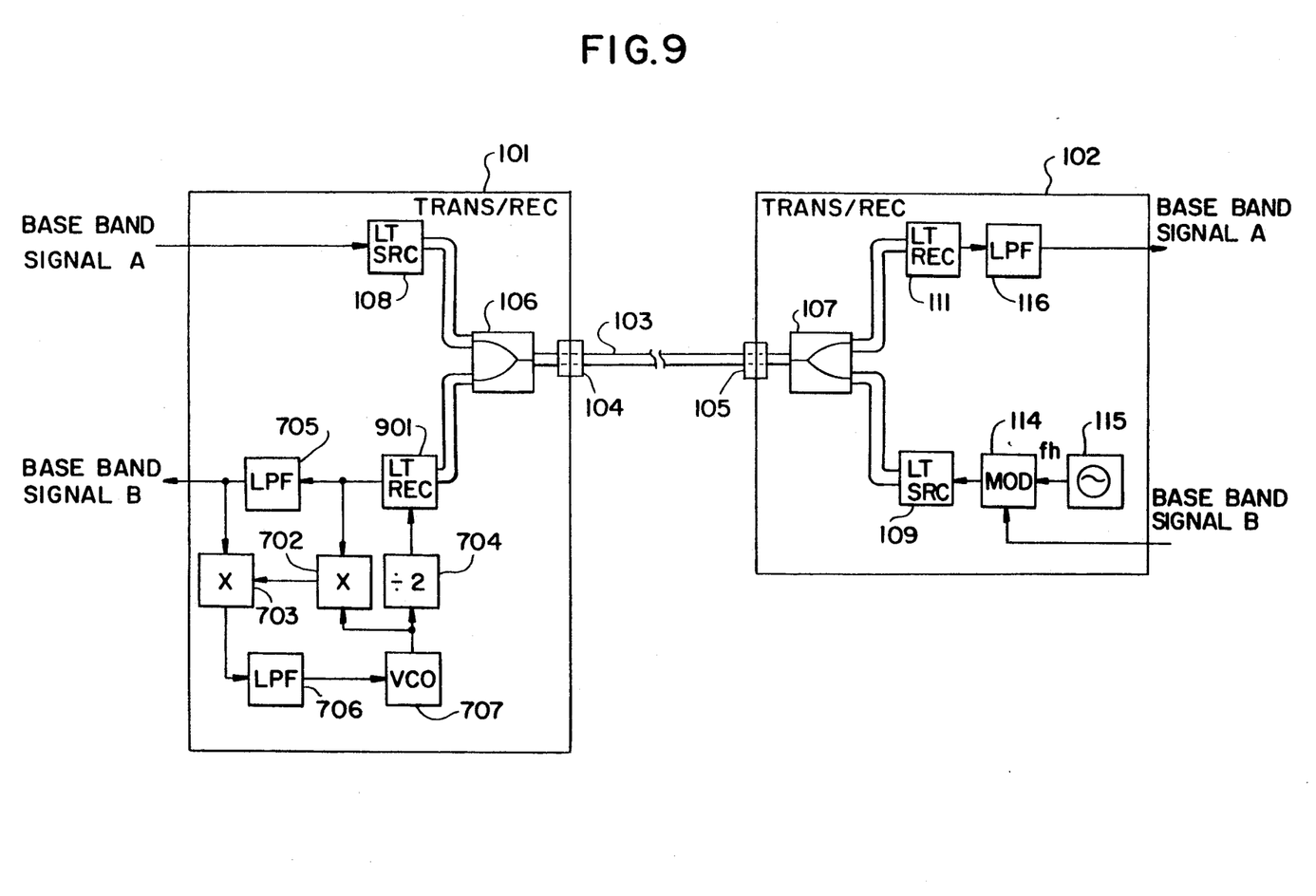
FIG. 9 is a pictorical view showing a fourth embodiment of a bidirectional optical transmission apparatus according to the present invention.

FIG. 9 is a diagram illustrative of a fourth embodiment of the invention. A signal from a divide by 2 frequency divider 704 is applied to the light receiver 901 within the present optical transmitting/receiving unit 101. When an AC signal is applied to the light receiver employing a photo-diode or a photo-conductor, the operator provides for multiplying the opto-electronic converted signal by the AC signal. Accordingly, the light receiver 901 could operate as both the light receiver and the multiplier by using only one element, and there could thus be obtained a cost reduction corresponding to one multiplier to be reduced.

As hereinbefore fully described, according to the present invention, the bidirectional optical transmissions could be carried out with the apparatus at lower cost since the interfering signals produced by reflection could be removed through the use of only one set of subcarrier modulator and demodulator free of the expensive light wave combining/splitting unit.

What is claimed is:

1. A bidirectional optical transmission system comprising:
   two optical transmitting/receiving units connected to each other by a single optical transmission path, in which light beams travel in both directions on said optical transmission path to carry out bidirectional communication by first and second base band signals, wherein a first light beam traveling in a first direction is only modulated by said first base band signal having a frequency band fA and a second light beam traveling in a second direction is modulated by a subcarrier signal fh which is modulated by said second base band signal having a frequency band fB;
   one of said two optical transmitting/receiving units comprising
      first light source means for generating said first light beam modulated by said first base band signal;
      second light receiver means for receiving said second light beam;
      high pass filter means for filtering an output signal from said second light receiver means;
      demodulator means for demodulating an output signal from said high pass filter means to generate said second base band signal;
      a first optical connector connected to one end of said optical transmission path; and
      a first optical coupler connected to said first light source means, said second light receiver means and said first optical connector for coupling said first light beam for transmitting said second light beam for receiving; and
   another of said two optical transmitting/receiving units comprising
      subcarrier generating means for generating said subcarrier signal fh (wherein fh≧fA+fB);
      modulator means for modulating said subcarrier signal by said second base band signal;
      second light source means for generating said second light beam;
      first light receiver means for receiving said first light beam;

low pass filter means for filtering an output signal from said first light receiver means;

a second optical connector connected to another end of said optical transmission path; and a second optical coupler connected to said second light source means, said first light receiver means and said second optical connector for coupling said first light beam for reception and said second light beam for transmission.

2. A bidirectional optical transmission system as claimed in claim 1, wherein said another transmitting/receiving unit further comprises pulse producing means connected between said modulator means and said second light source means for converting an output subcarrier signal of said modulator means into a binary digital signal to input said binary digital signal to said second light source means.

3. A bidirectional optical transmission system comprising:

two optical transmitting/receiving units connected to each other by a single optical transmission path, in which light beams travel in both directions on said optical transmission path to carry out bidirectional communication by first and second base band signals, wherein a first light beam traveling in a first direction is only modulated by said first base band signal having a frequency band fA and a second light beam traveling in a second direction is modulated by a subcarrier signal fh which is modulated by said second base band signal having a frequency band fB, one of said two optical transmitting/receiving units comprising first light source means for generating said first light beam modulated by said first base band signal;

second light receiver means for receiving said second light beam;

synchronizing detection demodulator means for demodulating an output signal from said second light receiver means to generate said second base band signal;

a first optical connector connected to one end of said optical transmission path; and a first optical coupler connected said first light source means, said second light receiver means and said first optical connector for coupling said first light beam for transmitting and said second light beam for receiving; and another of said two optical transmitting/receiving units comprising subcarrier generating means for generating said subcarrier signal fh (wherein $fh \geq fA + fB$);

modulator means for modulating said subcarrier signal by said second base band signal;

second light source means for generating said second light beam;

first light receiver means for receiving said first light beam;

low pass filter means for filtering an output signal from said first light receiver means;

a second optical connector connected to another end of said optical transmission path; and a second coupler connected to said second light source means, said first light receiver means and said second optical connector for coupling said first light beam for reception and said second light beam for transmission.

4. A bidirectional optical transmission system as claimed in claim 3, wherein said another transmitting/receiving unit further comprises pulse producing means connected between said modulator means and said second light source means for converting an output subcarrier signal of said modulator means into a binary digital signal to input said binary digital signal to said second light source means.

5. A bidirectional optical transmission system as claimed in claim 3, wherein said synchronizing detection demodulator means comprises:

a voltage controlled oscillator;

a frequency divider for dividing an output of said voltage controlled oscillator to provide a divided frequency signal;

a multiplier for multiplying an output of said second light receiver means by said divided frequency signal to provide a multiplied signal; and a low pass filter for receiving said multiplied signal and outputting only said second base band signal.

6. A bidirectional optical transmission system as claimed in claim 5, wherein said second light receiver means includes one of a photo-diode and a photo-conductor, and said second light receiver means also operates as said multiplier by applying an AC signal.

* * * * *